United States Patent
Takeuchi et al.

(10) Patent No.: US 9,786,908 B2
(45) Date of Patent: Oct. 10, 2017

(54) POSITIVE ELECTRODE FOR NON-AQUEOUS ELECTROLYTE SECONDARY BATTERY AND NON-AQUEOUS ELECTROLYTE SECONDARY BATTERY

(71) Applicant: SANYO Electric Co., Ltd., Moriguchi-shi, Osaka (JP)

(72) Inventors: Masanobu Takeuchi, Hyogo (JP); Manabu Takijiri, Osaka (JP); Katsunori Yanagida, Hyogo (JP); Junichi Sugaya, Osaka (JP); Takeshi Ogasawara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 310 days.

(21) Appl. No.: 14/387,359

(22) PCT Filed: Jan. 31, 2013

(86) PCT No.: PCT/JP2013/052187
§ 371 (c)(1),
(2) Date: Sep. 23, 2014

(87) PCT Pub. No.: WO2013/145846
PCT Pub. Date: Oct. 3, 2013

(65) Prior Publication Data
US 2015/0056512 A1    Feb. 26, 2015

(30) Foreign Application Priority Data

Mar. 30, 2012 (JP) .................................. 2012-079117

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
CPC ...... H01M 4/366; H01M 4/131; H01M 4/505; H01M 4/525; H01M 4/62; H01M 2004/028
See application file for complete search history.

(56) References Cited

U.S. PATENT DOCUMENTS

| | | |
|---|---|---|
| 2009/0081547 A1 | 3/2009 | Nakura |
| 2011/0076571 A1 | 3/2011 | Matsumoto et al. |
| 2011/0117434 A1 | 5/2011 | Ogasawara et al. |

FOREIGN PATENT DOCUMENTS

| | | |
|---|---|---|
| CN | 102035023 A | 4/2011 |
| JP | 2005-320184 A | 11/2005 |

(Continued)

OTHER PUBLICATIONS

International Search Report dated Mar. 26, 2013, issued in corresponding application No. PCT/JP2013/052187.
(Continued)

*Primary Examiner* — Laura Weiner
(74) *Attorney, Agent, or Firm* — Westerman, Hattori, Daniels & Adrian, LLP

(57) ABSTRACT

An object is to provide a positive electrode for a non-aqueous electrolyte secondary battery and a non-aqueous electrolyte secondary battery that allow a high output characteristic. Included are a positive electrode collector and a positive electrode mixture layer formed on at least one surface of the positive electrode collector. The positive electrode mixture layer contains particles 3 of lithium nickel cobalt manganese oxide represented by
(Continued)

$LiNi_{0.55}Co_{0.2}OMn_{0.25}O_2$, erbium oxyhydroxide 1 fixed on the surfaces of the particles of the lithium nickel cobalt manganese oxide 3, tungsten trioxide 2 adhering to the surfaces of the particles of the lithium nickel cobalt manganese oxide 3, and a binder.

7 Claims, 1 Drawing Sheet

(51) Int. Cl.
    *H01M 4/505*     (2010.01)
    *H01M 4/525*     (2010.01)
    *H01M 4/62*     (2006.01)
    *H01M 4/02*     (2006.01)
(52) U.S. Cl.
    CPC ........ *H01M 4/62* (2013.01); *H01M 2004/028* (2013.01)

(56) References Cited

FOREIGN PATENT DOCUMENTS

| | | |
|---|---|---|
| JP | 2007-18795 A | 1/2007 |
| JP | 2007-18985 A | 1/2007 |
| JP | 2008-226495 A | 9/2008 |
| JP | 2011-216300 A | 10/2011 |
| WO | 2010/004973 A1 | 1/2010 |
| WO | 2012/099265 A1 | 7/2012 |

OTHER PUBLICATIONS

English Translation of Written Opinion of the International Searching Authority dated Mar. 26, 2013, issued in corresponding Application No. PCT/JP2013/052187; (6 pages).

Office Action dated Jan. 5, 2016, issued in counterpart Chinese Application No. 201380017593.6 ( 7 pages).

POSITIVE ELECTRODE FOR NON-AQUEOUS ELECTROLYTE SECONDARY BATTERY AND NON-AQUEOUS ELECTROLYTE SECONDARY BATTERY

TECHNICAL FIELD

The present invention relates to a positive electrode for a non-aqueous electrolyte secondary battery and a non-aqueous electrolyte secondary battery including the positive electrode.

BACKGROUND ART

Non-aqueous electrolyte secondary batteries that are small-sized, lightweight, and high-capacity batteries are widely used as power sources for mobile devices. In addition, these batteries have recently been attracting attention as driving power sources for power tools, electric vehicles, and the like. Thus, the batteries are expected to be used in wider applications. Regarding such driving power sources, there is a demand for a higher capacity that allows long operation and enhancement of high-rate discharge characteristics of discharging a high current in relatively short time. In particular, in the applications of power tools, electric vehicles, and the like, it is necessary to achieve a higher capacity while high-rate discharge characteristics are maintained.

A technique for achieving a higher battery capacity is, for example, increasing the charging voltage to thereby widen the available voltage range. However, such an increase in the charging voltage causes an increase in the oxidizing power of the positive electrode active material. In addition, the positive electrode active material contains a transition metal (such as Co, Mn, Ni, or Fe) that functions as a catalyst. Accordingly, for example, a decomposition reaction of the electrolytic solution occurs so that a film inhibiting high-rate discharge is formed on the surface of the positive electrode active material, which is problematic. With consideration of the foregoing, the following have been proposed.
(1) A proposal in which a positive electrode active material containing lanthanum atoms in the surface is used to thereby suppress a decomposition reaction of the electrolytic solution (refer to Patent Literature 1 below).
(2) A proposal in which the surface of a spinel lithium manganese oxide serving as a positive electrode active material is modified with a tungsten-containing oxide to thereby enhance high-rate discharge characteristics (refer to Patent Literature 2 below).

CITATION LIST

Patent Literature

PTL 1: Japanese Published Unexamined Patent Application No. 2008-226495
PTL 2: Japanese Published Unexamined Patent Application No. 2005-320184

SUMMARY OF INVENTION

Technical Problem

However, regarding the proposal in (1), the high-rate discharge characteristics cannot be enhanced, though the decomposition reaction of the electrolytic solution can be suppressed to some extent.

Regarding the proposal in (2), charging to a high voltage results in formation of a film that is a resistive layer on the surface of the positive electrode active material. Accordingly, the high-rate discharge characteristics cannot be significantly enhanced.

Solution to Problem

According to the present invention, included are a positive electrode collector and a positive electrode mixture layer formed on at least one surface of the positive electrode collector; and the positive electrode mixture layer contains a positive electrode active material containing particles of a layered-structure lithium transition metal oxide that have a rare-earth compound fixed on surfaces of the particles, a tungsten-containing oxide, and a binder.

Advantageous Effects of Invention

The present invention can provide advantageous effects of significant enhancement of the high-rate discharge characteristics.

DESCRIPTION OF EMBODIMENTS

Figure 1:
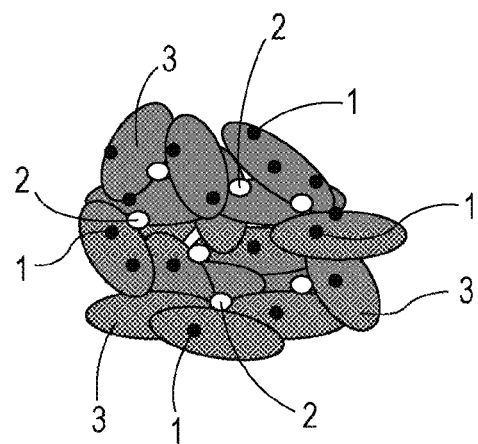
FIG. 1 is an explanatory view of a positive electrode active material according to an embodiment of the present invention.

According to the present invention, included are a positive electrode collector and a positive electrode mixture layer formed on at least one surface of the positive electrode collector; and the positive electrode mixture layer contains a positive electrode active material containing particles of a layered-structure lithium transition metal oxide that have a rare-earth compound fixed on surfaces of the particles, a tungsten-containing oxide, and a binder.

In such a configuration where a rare-earth compound is present on the surfaces of particles of a layered-structure lithium transition metal oxide and a positive electrode mixture layer contains a tungsten-containing oxide, even in the case of charging to a high voltage, films formed on the surfaces of positive electrode active material particles have enhanced lithium ion permeability and conductivity. In other words, in this configuration, the surface of the positive electrode active material can be modified. Accordingly, even in the case of charging to a high voltage, the lithium-ion intercalation/deintercalation reaction at the interface between the positive electrode active material and the non-aqueous electrolyte is promoted, so that high-rate discharge characteristics are enhanced. Note that these effects increase in the case where the tungsten-containing oxide and the rare-earth compound are disposed close to each other. Accordingly, in particular, the tungsten-containing oxide desirably adheres to the surfaces of the particles of the lithium transition metal oxide.

Note that the high-rate discharge characteristics are not enhanced only by a rare-earth compound fixed on the surfaces of the particles of the lithium transition metal oxide or only by a tungsten-containing oxide present in the positive electrode mixture layer.

When a rare-earth compound is just fixed on the surfaces of the particles of the lithium transition metal oxide, a high electrolytic overvoltage is applied to the electrolytic solution during formation of a film on the surface of the positive electrode active material. Accordingly, the structure of the surface of the positive electrode active material, the surface being in contact with the electrolytic solution, may be destroyed or the absolute quantity of the film formed on the surface of the positive electrode active material may be increased (the film is excessively formed on the surface of the positive electrode active material). As a result, the lithium-ion intercalation/deintercalation reaction at the interface between the positive electrode active material and the non-aqueous electrolyte is inhibited. On the other hand, when a tungsten-containing oxide is just present in the positive electrode mixture layer, the tungsten-containing oxide increases the resistance, so that the ion mobility or the electron conductivity of the positive electrode mixture layer is decreased.

In contrast, when a rare-earth compound is fixed on the surfaces of the particles of the lithium transition metal oxide and a tungsten-containing oxide is present in the positive electrode mixture layer (in particular, the tungsten-containing oxide is disposed close to the rare-earth compound), the tungsten-containing oxide functions as a catalyst, so that a film that is thin and dense and has a high lithium-ion permeability is formed on the surface of the lithium transition metal oxide and the formed film has enhanced stability and electron conductivity. Such unique effects are probably provided by the presence of the rare-earth-element compound and the tungsten-containing oxide and by the high electron-withdrawing capability of the rare-earth element due to, for example, the presence of the 4f orbit. Such unique effects probably result in enhancement of the high-rate discharge characteristics.

As described above, the tungsten-containing oxide desirably adheres to ("adhere" includes the state of being fixed) the surfaces of the particles of the lithium transition metal oxide. For the production of a lithium transition metal oxide having such a configuration, use of a sintering process (heat treatment at 400° C. to 700° C.) as described in PTL 2 above is not preferred. The reason for this is as follows.

In a case where a layered-structure lithium transition metal oxide is used as in the present invention, a heat treatment at high temperature promotes dissolution of tungsten in the lithium transition metal oxide. Accordingly, the transition metal originally having an average oxidation number of three is partially changed so as to have an oxidation number of two. Thus, a resistive layer is formed so that high-rate discharge characteristics are degraded. When a lithium transition metal oxide to which a rare-earth compound adheres and a tungsten-containing oxide are present, a heat treatment at high temperature causes the tungsten-containing oxide to diffuse into the lithium transition metal oxide. Accordingly, the effect provided by addition of the tungsten-containing oxide is not sufficiently exhibited and the above-described effects cannot be obtained.

As described in PTL 2, in the case where a lithium transition metal oxide having a spinel structure is used, effects of the present invention also cannot be obtained. The reason for this is probably as follows. In the lithium transition metal oxide having a spinel structure, the transition metal has an average valence of four. Accordingly, the state of this transition metal is different from that in a layered-structure lithium transition metal oxide having an average valence of three.

The rare-earth compound is desirably a rare-earth hydroxide, a rare-earth oxyhydroxide, or a rare-earth oxide, in particular, desirably a rare-earth hydroxide or a rare-earth oxyhydroxide. This is because use of such compounds further enhances the above-described effects. Note that the rare-earth compound may additionally contain, as another component, a rare-earth carbonate compound, a rare-earth phosphate compound, or the like.

The rare-earth element contained in the rare-earth compound may be yttrium, lanthanum, cerium, neodymium, samarium, europium, gadolinium, cerium, terbium, dysprosium, holmium, erbium, thulium, ytterbium, or lutetium; in particular, preferred are neodymium, samarium, and erbium. This is because, in particular, neodymium compounds, samarium compounds, and erbium compounds tend to be uniformly deposited on the surface of the positive electrode active material.

Specific examples of the rare-earth compound include neodymium hydroxide, neodymium oxyhydroxide, samarium hydroxide, samarium oxyhydroxide, erbium hydroxide, and erbium oxyhydroxide. In the case where lanthanum hydroxide or lanthanum oxyhydroxide is used as the rare-earth compound, lanthanum is inexpensive and hence the production cost of the positive electrode can be reduced.

The rare-earth compound desirably has an average particle size of 1 nm or more and 100 nm or less.

When the average particle size of the rare-earth compound is more than 100 nm, the particle size of the rare-earth compound is excessively large relative to the particle size of the lithium transition metal oxide particles, so that the rare-earth compound does not densely cover the surfaces of the lithium transition metal oxide particles. Accordingly, the lithium transition metal oxide particles have a large area for direct contact with the non-aqueous electrolyte and its reduction decomposition products. Thus, the degree of oxidation decomposition of the non-aqueous electrolyte and its reduction decomposition products is increased and the charge-discharge characteristics are degraded.

On the other hand, when the average particle size of the rare-earth compound is less than 1 nm, the surfaces of the lithium transition metal oxide particles are excessively densely covered by a rare-earth hydroxide or the like. As a result, the lithium-ion intercalation/deintercalation capability in the surfaces of the lithium transition metal oxide particles is degraded and the charge-discharge characteristics are degraded. In view of such reasons, the rare-earth compound more preferably has an average particle size of 10 nm or more and 50 nm or less.

In order to fix the rare-earth compound such as erbium oxyhydroxide on the lithium transition metal oxide, for example, an aqueous solution in which an erbium salt is dissolved may be mixed with a solution in which the lithium transition metal oxide is dispersed. There is another method in which an aqueous solution in which an erbium salt is dissolved is sprayed to the lithium transition metal oxide being mixed and then dried.

In particular, preferred is the method in which an aqueous solution in which a rare-earth salt such as an erbium salt is dissolved is mixed with a solution in which the lithium transition metal oxide is dispersed. This is because the rare-earth compound can be fixed in a more uniformly dispersed state on the surface of the lithium transition metal oxide. In this method, the solution in which the lithium transition metal oxide is dispersed is preferably controlled so as to have a constant pH. In particular, in order to deposit 1 to 100-nm fine particles in a uniformly dispersed state on the surface of the lithium transition metal oxide, the pH is preferably controlled so as to be 6 to 10.

The reason for this is as follows. When the pH is less than 6, the transition metal of the lithium transition metal oxide may be released. On the other hand, when the pH is more than 10, the rare-earth compound may segregate.

The ratio of the rare-earth element to the total molar quantity of the lithium transition metal oxide is desirably 0.003 mol % or more and 0.25 mol % or less. The reason for this is as follows. When the ratio is less than 0.003 mol %, the effect provided by fixing the rare-earth compound may be insufficiently exhibited. On the other hand, when the ratio is more than 0.25 mol %, the lithium-ion permeability of the surfaces of the lithium transition metal oxide particles becomes low and high-rate discharge characteristics may be degraded.

The ratio of the molar quantity of the tungsten-containing oxide to the total molar quantity of the positive electrode active material is preferably 0.01 mol % or more and 3 mol % or less, more preferably 0.05 mol % or more and 2 mol % or less, still more preferably 0.1 mol % or more and 0.5 mol % or less. In the case where the adhesion amount of the tungsten-containing oxide is less than 0.01 mol %, the adhesion amount is so low that there is a possibility that the effect is not sufficiently exhibited and hence significant enhancement of high-rate discharge characteristics cannot be achieved. On the other hand, in the case where the adhesion amount is more than 3 mol %, the amount of the adhesion compound that does not participate in the reaction is excessively high. Thus, the capacity of the positive electrode may be decreased and the lithium intercalation/deintercalation reaction is inhibited, so that the high-rate discharge characteristics may be degraded.

The tungsten oxide may be, for example, tungsten trioxide ($WO_3$), tungsten dioxide ($WO_2$), or lithium tungstate ($Li_2WO_4$). Of these, tungsten trioxide is the most desirable.

Note that, in the case where the rare-earth compound is a rare-earth hydroxide or a rare-earth oxyhydroxide, in particular, the tungsten-containing oxide is preferably tungsten trioxide. The reason for this is as follows. In the case where a rare-earth hydroxide or a rare-earth oxyhydroxide is fixed on the surface of the lithium transition metal oxide, due to the influences of the alkaline component or adsorption water of the rare-earth hydroxide or the like, tungsten trioxide tends to be disposed close to the rare-earth hydroxide or the like fixed on the surface of the lithium transition metal oxide.

The lithium transition metal oxide may be a layered-structure lithium transition metal oxide represented by a general formula of $LiMeO_2$ (where Me represents at least one selected from the group consisting of Ni, Co, and Mn). Note that the lithium transition metal oxide may further contain at least one selected from the group consisting of magnesium, aluminum, titanium, chromium, vanadium, iron, copper, zinc, niobium, molybdenum, zirconium, tin, tungsten, sodium, and potassium; in particular, preferably contains aluminum.

Specific examples of the lithium transition metal oxide particles preferably used include lithium cobalt oxide ($LiCoO_2$), lithium nickel oxide ($LiNiO_2$), lithium nickel cobalt manganese oxide (such as $LiNi_{1/3}Co_{1/3}Mn_{1/3}O_2$), and lithium nickel cobalt aluminum oxide (such as $LiNi_{0.8}Co_{0.15}Al_{0.05}O_2$). In particular, preferred are lithium cobalt oxide, lithium nickel cobalt manganese oxide, and lithium nickel cobalt aluminum oxide. Of these, particularly preferred is lithium nickel cobalt manganese oxide.

In the case where lithium cobalt oxide is used as the lithium transition metal oxide, high-rate discharge characteristics at low temperature are considerably enhanced. In the case where lithium nickel cobalt manganese oxide is used as the lithium transition metal oxide, high-rate discharge characteristics at room temperature are considerably enhanced. Furthermore, in the case where lithium nickel cobalt aluminum oxide is used as the lithium transition metal oxide, the specific capacity per unit mass is increased. Note that the reason why, in the case where lithium nickel cobalt manganese oxide is used as the lithium transition metal oxide, high-rate discharge characteristics at room temperature are considerably enhanced is probably as follows: a film formed on the surface of lithium nickel cobalt manganese oxide specifically has a high lithium-ion permeability and a high conductivity.

The lithium nickel cobalt manganese oxide preferably satisfies a general formula of $Li_aNi_xCo_yMn_zO_2$ ($0.95<a<1.20$, $0.30 \leq x \leq 0.80$, $0.10 \leq y \leq 0.40$, $0.10 \leq z \leq 0.50$), more preferably $Li_aNi_xCo_yMn_zO_2$ ($0.95<a<1.20$, $0.30 \leq x \leq 0.60$, $0.20 \leq y \leq 0.40$, $0.20 \leq z \leq 0.40$), in particular, more preferably a general formula of $Li_aNi_xCo_yMn_zO_2$ ($0.95<a<1.20$, $0.35 \leq x \leq 0.55$, $0.20 \leq y \leq 0.35$, $0.25 \leq z \leq 0.30$).

When the value a is 0.95 or less, the stability of the crystalline structure is degraded and hence retention of the capacity after cycle use or suppression of degradation of the output characteristic is not sufficiently achieved. On the other hand, when the value a is 1.20 or more, the amount of gas generated becomes large.

When the value x is less than 0.30 or the value y is more than 0.40, the charge-discharge capacity is gradually decreased. On the other hand, when the value x is more than 0.80 or the value y is less than 0.10, a lithium diffusion rate in the inside of the active material is gradually decreased and the rate-determining step in the reaction shifts from the surface to the inside of the active material. Thus, the effect cannot be sufficiently exhibited. When the value z is less than 0.10, element position substitution between a portion of nickel and lithium in the crystalline structure tends to be caused, so that the output characteristic is degraded. When the value z is more than 0.50, the structure becomes unstable and it becomes difficult to obtain lithium nickel cobalt manganese oxide with stability during the synthesis of the active material.

The lithium nickel cobalt aluminum oxide preferably satisfies a general formula of $Li_aNi_xCo_yAl_zO_2$ ($0.95<a<1.20$, $0.50 \leq x \leq 0.99$, $0.01 \leq y \leq 0.50$, $0.01 \leq z \leq 0.10$), more preferably a general formula of $Li_aNi_xCo_yAl_zO_2$ ($0.95<a<1.20$, $0.70 \leq x \leq 0.95$, $0.05 \leq y \leq 0.30$, $0.01 \leq z \leq 0.10$).

When the value a is 0.95 or less, the stability of the crystalline structure is degraded and hence retention of the capacity after cycle use or suppression of degradation of the output characteristic is not sufficiently achieved. On the other hand, when the value a is 1.2 or more, the amount of gas generated becomes large.

When the value x is less than 0.50 or the value y is more than 0.50, the charge-discharge capacity is gradually decreased. On the other hand, when the value z is more than 0.10, a lithium diffusion rate in the inside of the active material is decreased and the rate-determining step in the reaction shifts from the surface to the inside of the active material. Thus, the effect cannot be sufficiently exhibited.

When the value x is more than 0.99, the value z is less than 0.01, or the value y is less than 0.01, the structural stability is degraded.

The lithium transition metal oxide desirably forms secondary particles provided by aggregation of primary particles, and the tungsten-containing oxide is desirably present within gaps between the primary particles.

The specific structure is illustrated in FIG. 1: a tungsten-containing oxide (such as tungsten trioxide) 2 is present within gaps between primary particles 3 of the lithium transition metal oxide (such as lithium nickel cobalt manganese oxide). Note that, in FIG. 1, reference sign 1 denotes a rare-earth compound (such as erbium oxyhydroxide).

In such a configuration, the adhesion strength of the tungsten-containing oxide adhering to the surfaces of the lithium transition metal oxide particles becomes high. Accordingly, in the step of producing a positive electrode performed thereafter, separation of the tungsten-containing oxide from the lithium transition metal oxide particles can be suppressed. Thus, the tungsten-containing oxide is always present close to the rare-earth compound, so that effects of the present invention are sufficiently exhibited.

Examples of the lithium transition metal oxide that forms secondary particles provided by aggregation of primary particles include lithium cobalt oxide, lithium nickel cobalt manganese oxide, and lithium nickel cobalt aluminum oxide. In order to form secondary particles, the ratio of the particle size of primary particles to the particle size of the secondary particles is preferably 1/20 or more and 1/2 or less.

In order to form a film of good quality on the surface of the lithium transition metal oxide, the ratio of the particle size of the tungsten-containing oxide to the particle size of the lithium transition metal oxide is preferably 1/10 or more and 1/2 or less, in particular, preferably 1/8 or more and 1/4 or less. This is because, when such a range is satisfied, the tungsten-containing oxide sufficiently enters regions between primary particles of the lithium transition metal oxide, so that the tungsten-containing oxide and the rare-earth compound together allow formation of a film of good quality.

Note that a method for producing the positive electrode mixture may be a method of mixing a tungsten-containing oxide with a lithium transition metal oxide having a rare-earth compound fixed on its surface. The mixing method is not particularly limited. The mixing method is, for example, a method of mixing a tungsten-containing oxide during preparation of positive electrode slurry with a kneading machine; or a method in which a tungsten-containing oxide is made to adhere to the surface of a lithium transition metal oxide with a dry mixing machine and positive electrode slurry is subsequently prepared. In the case of using the latter method, the probability that the tungsten-containing oxide and the rare-earth compound are disposed close to each other becomes high and hence the latter method is desirably used.

A specific example of the kneading machine is a planetary mixer. Specific examples of the dry mixing machine include "Nanocular", "Nobilta", and "Mechanofusion", which are manufactured by Hosokawa Micron Corporation; and a rotational ball mill, Hybridization System, and Mechano Micros, which are manufactured by Nara Machinery Co., Ltd.

(Other Features)
(1) In a non-aqueous electrolyte secondary battery according to the present invention, a negative electrode active material used for the negative electrode is not particularly limited as long as it can reversibly occlude or release lithium. Examples of the active material include carbon materials, metals or alloy materials that form alloys with lithium, and metal oxides. From the standpoint of the material cost, carbon materials are preferably used as the negative electrode active material. Examples of the carbon materials include natural graphite, synthetic graphite, mesophase-pitch-based carbon fiber (MCF), mesocarbon microbeads (MCMB), coke, and hard carbon. In particular, in order to enhance high-rate charge-discharge characteristics, the negative electrode active material is preferably a carbon material obtained by covering a graphite material with low crystalline carbon.

(2) A solvent of a non-aqueous electrolyte used for the present invention is not limited and solvents having been used to date for non-aqueous electrolyte secondary batteries can be used. Examples of the solvents include cyclic carbonates such as ethylene carbonate, propylene carbonate, butylene carbonate, and vinylene carbonate; linear carbonates such as dimethyl carbonate, methyl ethyl carbonate, and diethyl carbonate; ester-containing compounds such as methyl acetate, ethyl acetate, propyl acetate, methyl propionate, ethyl propionate, and γ-butyrolactone; sulfonic-group-containing compounds such as propanesultone; ether-containing compounds such as 1,2-dimethoxyethane, 1,2-diethoxyethane, tetrahydrofuran, 1,2-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amido-containing compounds such as dimethylformamide. In particular, such solvents in which H's are partially replaced by F's are preferably used. Such solvents can be used alone or in combination. In particular, preferred are a solvent of a combination of a cyclic carbonate and a linear carbonate, and such a solvent that further contains a small amount of a nitrile-containing compound or an ether-containing compound.

A non-aqueous solvent of a non-aqueous electrolytic solution may be an ionic liquid. In this case, the cationic species and the anionic species are not particularly limited. From the standpoint of low viscosity, electrochemical stability, and hydrophobicity, particularly preferred is a combination of a cation that is a pyridinium cation, an imidazolium cation, or a quaternary ammonium cation and an anion that is a fluorine-containing imide-based anion.

Furthermore, a solute used for the non-aqueous electrolytic solution may also be a publicly known lithium salt having been commonly used for non-aqueous electrolyte secondary batteries. Such lithium salts may be lithium salts containing at least one element selected from P, B, F, O, S, N, and Cl. Specific examples include lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, and $LiClO_4$, and mixtures of the foregoing. In particular, in order to enhance high-rate charge-discharge characteristics and durability of non-aqueous electrolyte secondary batteries, $LiPF_6$ is preferably used.

(3) A layer composed of an inorganic filler having been used to date can be formed at the interface between the positive electrode and the separator or at the interface between the negative electrode and the separator. Examples of the filler include fillers having been used to date, such as oxides and phosphate compounds of one or more selected from titanium, aluminum, silicon, magnesium, and the like, and oxides and phosphate compounds whose surfaces are treated with hydroxides or the like.

Such a filler layer can be formed by, for example, a method in which filler-containing slurry is directly applied to the positive electrode, the negative electrode, or the separator; or a method in which a sheet formed of filler is bonded to the positive electrode, the negative electrode, or the separator.

(4) A separator used for the present invention may be a separator having been used to date. Specifically, the separator is not limited to a separator formed of polyethylene and may be a separator in which a polypropylene layer is formed on a surface of a polyethylene layer, or a separator in which a resin such as an aramid resin is applied to a surface of a polyethylene separator.

EXAMPLES

Hereinafter, the present invention will be described further in detail on the basis of specific examples. However, the present invention is not limited to the examples below. The present invention can be applied with appropriate modifications without departing from the spirit and scope of the present invention.

First Example

Example

Synthesis of Positive Electrode Active Material

Particles (1000 g) of lithium nickel cobalt manganese oxide represented by $LiNi_{0.55}Co_{0.20}Mn_{0.25}O_2$ were placed in 3 liters of pure water and stirred. Subsequently, to this solution, a solution in which 4.58 g of erbium nitrate pentahydrate was dissolved was added. At this time, a 10 mass % aqueous solution of sodium hydroxide was appropriately added such that the solution containing lithium nickel cobalt manganese oxide had a pH of 9. Subsequently, suction filtration and rinsing were performed. After that, the resultant powder was dried at 400° C. to provide lithium nickel cobalt manganese oxide on the surface of which erbium oxyhydroxide was uniformly fixed. After that, to 99.5 mol of the lithium nickel cobalt manganese oxide, 0.5 mol of tungsten trioxide having an average particle size of 150 nm was added and mixed, so that tungsten trioxide was made to adhere to the surface of the lithium nickel cobalt manganese oxide. In this way, a positive electrode active material was prepared.

The positive electrode active material was observed with a SEM. As a result, it was confirmed that, as illustrated in FIG. 1, the lithium nickel cobalt manganese oxide formed secondary particles having a particle size of about 10 μm provided by aggregation of primary particles 3 having a size of about 2 μm. In addition, it was also confirmed that tungsten trioxide 2 was disposed within the irregularities of the surface of the lithium nickel cobalt manganese oxide and the tungsten trioxide 2 strongly adhered to the lithium nickel cobalt manganese oxide.

[Production of Single-Electrode Cell (Positive Electrode)]

The positive electrode active material (100 parts by weight) was mixed with 4 parts by weight of carbon black serving as a carbon conductive agent and 2 parts by weight of polyvinylidene fluoride serving as a binder. Furthermore, an appropriate amount of NMP (N-methyl-2-pyrrolidone) was added to thereby prepare positive electrode slurry. Subsequently, the positive electrode slurry was applied to both surfaces of a positive electrode collector formed of aluminum and dried to form positive electrode mixture layers on the surfaces of the positive electrode collector. Finally, this member was cut so as to have a predetermined electrode size, rolled with a roller, and further provided with a positive electrode lead. Thus, a single-electrode cell (positive electrode) was produced.

[Production of Three-Electrode Test Cell]

Figure 2:
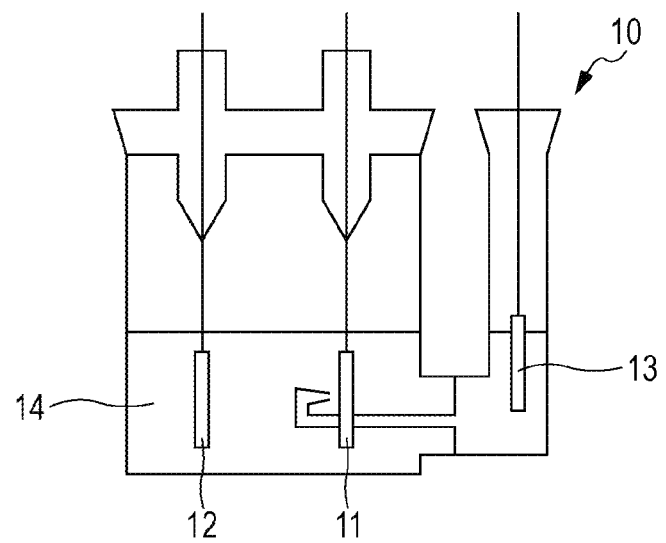
FIG. 2 is an explanatory view of a three-electrode test cell.

A three-electrode test cell 10 illustrated in FIG. 2 was produced. At this time, the above-described positive electrode was used as a working electrode 11; on the other hand, a counter electrode 12 serving as a negative electrode and a reference electrode 13 were formed of metal lithium. The following non-aqueous electrolytic solution 14 was used: in a solvent mixture containing ethylene carbonate, methyl ethyl carbonate, and dimethyl carbonate in a volume ratio of 3:3:4, $LiPF_6$ was dissolved at a concentration of 1 mol/l and further vinylene carbonate was dissolved at 1 mass %.

The thus-produced cell will be referred to as Cell A.

Comparative Example 1

A cell was produced as with the Cell A except that erbium oxyhydroxide was not fixed on and tungsten trioxide was not made to adhere to the surface of the lithium nickel cobalt manganese oxide.

The thus-produced cell will be referred to as Cell Z1.

Comparative Example 2

A cell was produced as with the Cell A except that tungsten trioxide was not made to adhere to the surface of the lithium nickel cobalt manganese oxide.

The thus-produced cell will be referred to as Cell Z2.

Comparative Example 3

A cell was produced as with the Cell A except that erbium oxyhydroxide was not fixed on the surface of the lithium nickel cobalt manganese oxide.

The thus-produced cell will be referred to as Cell Z3.

Experiments

The Cells A and Z1 to Z3 were measured in terms of I-V resistance value and the results are described in Table 1. The experiment conditions were as follows.

Under a temperature condition of 25° C., the Cells A and Z1 to Z3 were subjected to constant-current charging at a current density of 0.2 mA/cm² until the voltage reached 4.5 V (vs. Li/Li⁺) and further subjected to constant-voltage charging at a constant voltage of 4.5 V (vs. Li/Li⁺) until the current density reached 0.04 mA/cm². Subsequently, each cell was subjected to constant-current discharging at current densities of 0.2 mA/cm², 2.5 mA/cm², 5.0 mA/cm², and 10 mA/cm² until the voltage reached 2.5 V (vs. Li/Li⁺). Subsequently, voltages at which the depth of discharge capacity (D.O.D) reached 5% during discharging at current densities of 0.2 mA/cm², 2.5 mA/cm², 5.0 mA/cm², and 10 mA/cm² were plotted against the current values. From the gradient of the current-potential straight line obtained by the plotting, a resistance value (I-V resistance value) was calculated. Note that, in Table 1, the values of the Cells A, Z2, and Z3 are described as index numbers relative to the value of the Cell Z1 defined as 100.

TABLE 1

| Cell | Positive electrode active material | Presence or absence of fixed erbium oxyhydroxide (Fixing amount) | Presence or absence of adhering tungsten trioxide (Adhesion amount) | I-V resistance value |
|---|---|---|---|---|
| A | $LiNi_{0.55}Co_{0.20}Mn_{0.25}O_2$ | Present (0.1 mol %) | Present (0.5 mol %) | 94.2 |
| Z1 | | Absent | Absent | 100.0 |
| Z2 | | Present (0.1 mol %) | Absent | 114.7 |
| Z3 | | Absent | Present (0.5 mol %) | 114.2 |

Note that the fixing amount of erbium oxyhydroxide denotes the ratio of erbium element to the total molar quantity of lithium nickel cobalt manganese oxide.

The adhesion amount of tungsten trioxide denotes the ratio of tungsten trioxide to the total molar quantity of the positive electrode active material.

Compared with the Cell Z1 in which nothing was made to adhere to the surface of the lithium nickel cobalt manganese oxide, high I-V resistance values were observed in the Cell Z2 in which only erbium oxyhydroxide was fixed on the surface of the lithium nickel cobalt manganese oxide and the Cell Z3 in which only tungsten trioxide was made to adhere to the surface of the lithium nickel cobalt manganese oxide. This indicates that the high-rate discharge characteristics were degraded. In contrast, compared with the Cell Z1, a low I-V resistance value was observed in the Cell A in which erbium oxyhydroxide was fixed on and tungsten trioxide was made to adhere to the surface of the lithium nickel cobalt manganese oxide. This indicates that the high-rate discharge characteristics were enhanced.

The reasons for the results are probably as follows. When only erbium oxyhydroxide was fixed on the surface of the lithium nickel cobalt manganese oxide, a film having a low lithium-ion permeability was formed on the surface of the lithium nickel cobalt manganese oxide, so that the high-rate discharge characteristics were degraded. When only tungsten trioxide was made to adhere to the surface of the lithium nickel cobalt manganese oxide, a film having a low conductivity was formed on the surface of the lithium nickel cobalt manganese oxide, so that the high-rate discharge characteristics were degraded.

In contrast, in the case where erbium oxyhydroxide was fixed on and tungsten trioxide was made to adhere to the surface of the lithium nickel cobalt manganese oxide, a film of good quality was formed on the surface of the lithium nickel cobalt manganese oxide, so that the high-rate discharge characteristics were enhanced.

Second Example

Example

A test cell was produced as with the Cell A except that, during adhesion of tungsten trioxide to the surface of the lithium nickel cobalt manganese oxide on which erbium oxyhydroxide was uniformly fixed, to 99.9 mol of the lithium nickel cobalt manganese oxide, 0.1 mol of tungsten trioxide having an average particle size of 150 nm was added and mixed.

The thus-produced cell will be referred to as Cell B.

Experiments

The Cell B and the Cells A and Z2 described in the First example were measured in terms of capacity retention ratio during high-rate discharging and the results are described in Table 2. The experiment conditions were as follows.

Under a temperature condition of 25° C., the Cells A, B, and Z2 were subjected to constant-current charging at a current density of 0.2 mA/cm² until the voltage reached 4.5 V (vs. Li/Li⁺), further subjected to constant-voltage charging at a constant voltage of 4.5 V (vs. Li/Li⁺) until the current density reached 0.04 mA/cm², and then subjected to constant-current discharging at a current density of 0.2 mA/cm² until the voltage reached 2.5 V (vs. Li/Li⁺). At this time, the discharge capacities were defined as the rated capacities of the Cells A, B, and Z2.

Subsequently, the Cells were subjected to constant-current charging at a current density of 0.2 mA/cm² until the voltage reached 4.5 V (vs. Li/Li⁺), further subjected to constant-voltage charging at a constant voltage of 4.5 V (vs. Li/Li⁺) until the current density reached 0.04 mA/cm², and then subjected to constant-current discharging at a current density of 10 mA/cm² until the voltage reached 2.5 V (vs. Li/Li⁺). At this time, the discharge capacities were defined as the high-rate discharge capacities of the Cells A, B, and Z2. The capacity retention ratio was calculated with the following formula (1).

$$\text{Capacity retention ratio} = (\text{High-rate discharge capacity}/\text{Rated capacity}) \times 100 \quad (1)$$

TABLE 2

| Cell | Positive electrode active material | Presence or absence of fixed erbium oxyhydroxide (Fixing amount) | Presence or absence of adhering tungsten trioxide (Adhesion amount) | Capacity retention ratio (%) |
|---|---|---|---|---|
| B | $LiNi_{0.55}Co_{0.20}Mn_{0.25}O_2$ | Present (0.1 mol %) | Present (0.1 mol %) | 82.1% |
| A | | | Present (0.5 mol %) | 82.3% |
| Z2 | | | Absent | 81.1% |

Note that the fixing amount of erbium oxyhydroxide denotes the ratio of erbium element to the total molar quantity of lithium nickel cobalt manganese oxide.

The adhesion amount of tungsten trioxide denotes the ratio of tungsten trioxide to the total molar quantity of the positive electrode active material.

Compared with the Cell Z2 in which tungsten trioxide was not made to adhere to the surface of the lithium nickel cobalt manganese oxide, high capacity retention ratios were observed and the high-rate discharge characteristics were enhanced in the Cells A and B in which tungsten trioxide was made to adhere to the surface of the lithium nickel cobalt manganese oxide. In addition, compared with the Cell Z2, high capacity retention ratios were observed in the Cells A and B respectively having tungsten trioxide amounts of 0.1 mol % and 0.5 mol %. This also indicates that, when the ratio of the molar quantity of tungsten trioxide to the total molar quantity of the positive electrode active material is 0.1 mol % or more and 0.5 mol % or less, a good film is formed with certainty on the surface of lithium nickel cobalt manganese oxide.

Third Example

Example

A test cell was produced as with the Cell A except that, regarding the layered-structure lithium transition metal oxide, the lithium nickel cobalt manganese oxide was replaced by lithium cobalt oxide ($LiCoO_2$).

The thus-produced cell will be referred to as Cell C.

Comparative Example

A test cell was produced as with the Cell C except that erbium oxyhydroxide was not fixed on and tungsten trioxide was not made to adhere to the surface of the lithium cobalt oxide.

The thus-produced cell will be referred to as Cell Y.

Experiments

The Cells C and Y were measured in terms of output characteristic and the results are described in Table 3. The experiment conditions were as follows. Under a temperature condition of 25° C., the Cells were subjected to constant-current charging at a current density of 0.2 mA/cm² until the voltage reached 4.5 V (vs. Li/Li⁺), further subjected to constant-voltage charging at 4.5 V (vs. Li/Li⁺), and then subjected to constant-current discharging at a current density of 0.2 mA/cm² until the voltage reached 2.5 V (vs. Li/Li⁺). At this time, the discharge capacities were defined as the rated capacities of the three-electrode test cells. Subsequently, the Cells C and Y were charged to 50% of the rated capacities. That is, at the time when the state of charge (SOC) was 50%, under a temperature condition of −30° C. and with different current values (1 mA/cm², 5 mA/cm², 10 mA/cm², 15 mA/cm², 20 mA/cm², and 30 mA/cm²), the voltages of the Cells during discharging for 10 seconds for each current value were measured. The current values and the voltages of the Cells were plotted. The current values at 2.5 V were determined by extrapolation. From the obtained current values, an output (W) that allows discharging for 10 seconds was determined.

Note that, in Table 3, the output characteristic of the Cell C is described as an index number relative to the output characteristic of the Cell Y defined as 100.

TABLE 3

| Cell | Positive electrode active material | Presence or absence of fixed erbium oxyhydroxide (Fixing amount) | Presence or absence of adhering tungsten trioxide (Adhesion amount) | Output characteristic |
|---|---|---|---|---|
| C | $LiCoO_2$ | Present (0.1 mol %) | Present (0.5 mol %) | 250 |
| Y | $LiCoO_2$ | Absent | Absent | 100 |

Note that the fixing amount of erbium oxyhydroxide denotes the ratio of erbium element to the total molar quantity of lithium cobalt oxide.

The adhesion amount of tungsten trioxide denotes the ratio of tungsten trioxide to the total molar quantity of the positive electrode active material.

As is obvious from Table 3, the output characteristic (high-rate discharge characteristic) at the low temperature is significantly enhanced in the Cell C in which erbium oxyhydroxide was fixed on and tungsten trioxide was made to adhere to the surface of the lithium cobalt oxide, compared with the Cell Y in which erbium oxyhydroxide was not fixed on and tungsten trioxide was not made to adhere to the surface of the lithium cobalt oxide. This is probably because, in the Cell C, a film of good quality was formed on the surface of the lithium cobalt oxide. Note that, in the case of using lithium cobalt oxide as the lithium transition metal oxide, the output characteristic at the low temperature is significantly enhanced. This is probably because a lithium diffusion rate in the inside of lithium cobalt oxide is sufficiently high and control of the reaction in the surface of lithium cobalt oxide is particularly important.

Fourth Example

Example

A test cell was produced as with the Cell A except that, regarding the lithium nickel cobalt manganese oxide, $LiNi_{0.55}Co_{0.20}Mn_{0.25}O_2$ was replaced by $LiNi_{0.35}Co_{0.35}Mn_{0.3}O_2$.

The thus-produced cell will be referred to as Cell D.

Comparative Example

A test cell was produced as with the Cell D except that erbium oxyhydroxide was not fixed on and tungsten trioxide was not made to adhere to the surface of the lithium nickel cobalt manganese oxide.

The thus-produced cell will be referred to as Cell X.

Experiments

The Cells D and x produced above were measured in terms of output characteristic and the results are described in Table 4. Note that the experiment conditions were the same as the conditions described in the Experiments of the Third example. In Table 4, the output characteristic of the Cell D is described as an index number relative to the output characteristic of the Cell X defined as 100.

TABLE 4

| Cell | Positive electrode active material | Presence or absence of fixed erbium oxyhydroxide (Fixing amount) | Presence or absence of adhering tungsten trioxide (Adhesion amount) | Output characteristic |
|---|---|---|---|---|
| D | $LiNi_{0.35}Co_{0.35}Mn_{0.3}O_2$ | Present (0.1 mol %) | Present (0.5 mol %) | 138 |
| X |  | Absent | Absent | 100 |

Note that the fixing amount of erbium oxyhydroxide denotes the ratio of erbium element to the total molar quantity of lithium nickel cobalt manganese oxide.

The adhesion amount of tungsten trioxide denotes the ratio of tungsten trioxide to the total molar quantity of the positive electrode active material.

As is obvious from Table 4, the output characteristic (high-rate discharge characteristic) at the low temperature is significantly enhanced in the Cell D in which erbium oxyhydroxide was fixed on and tungsten trioxide was made to adhere to the surface of the lithium nickel cobalt manganese oxide, compared with the Cell X in which erbium oxyhydroxide was not fixed on and tungsten trioxide was not made to adhere to the surface of the lithium nickel cobalt manganese oxide. This is probably because, in the Cell D, a film of good quality was formed on the surface of the lithium nickel cobalt manganese oxide.

Instead of erbium oxyhydroxide, samarium oxyhydroxide and neodymium oxyhydroxide were used. As a result, it was confirmed that the effects were similarly provided.

Fifth Example

Example

A test cell was produced as with the Cell A except that, regarding the layered-structure lithium transition metal oxide, lithium nickel cobalt manganese oxide was replaced by lithium nickel cobalt aluminum oxide ($LiNi_{0.80}Co_{0.15}Al_{0.05}O_2$).

The thus-produced cell will be referred to as Cell E.

Comparative Example 1

A test cell was produced as with the Cell E except that erbium oxyhydroxide was not fixed on and tungsten trioxide was not made to adhere to the surface of the lithium nickel cobalt aluminum oxide.

The thus-produced cell will be referred to as Cell W1.

Comparative Example 2

A test cell was produced as with the Cell E except that tungsten trioxide was not made to adhere to the surface of the lithium nickel cobalt aluminum oxide.

The thus-produced cell will be referred to as Cell W2.

Comparative Example 3

A test cell was produced as with the Cell E except that erbium oxyhydroxide was not fixed on the surface of the lithium nickel cobalt aluminum oxide.

The thus-produced cell will be referred to as Cell W3.

Experiments

The Cells E and W1 to W3 produced above were measured in terms of output characteristic and the results are described in Table 5. Note that the experiment conditions were the same as the conditions described in the Experiments of the Third example. In Table 5, the output characteristics of the Cells E, W2, and W3 are described as index numbers relative to the output characteristic of the Cell W1 defined as 100.

TABLE 5

| Cell | Positive electrode active material | Presence or absence of fixed erbium oxyhydroxide (Fixing amount) | Presence or absence of adhering tungsten trioxide (Adhesion amount) | Output characteristic |
|---|---|---|---|---|
| E | $LiNi_{0.80}Co_{0.15}Al_{0.05}O_2$ | Present (0.1 mol %) | Present (0.5 mol %) | 105 |
| W1 |  | Absent | Absent | 100 |
| W2 |  | Present (0.1 mol %) | Absent | 97 |
| W3 |  | Absent | Present (0.5 mol %) | 99 |

Note that the fixing amount of erbium oxyhydroxide denotes the ratio of erbium element to the total molar quantity of lithium nickel cobalt aluminum oxide.

The adhesion amount of tungsten trioxide denotes the ratio of tungsten trioxide to the total molar quantity of the positive electrode active material.

As is obvious from Table 5, the output characteristic (high-rate discharge characteristic) at the low temperature is enhanced in the Cell E in which erbium oxyhydroxide was fixed on and tungsten trioxide was made to adhere to the surface of the lithium nickel cobalt aluminum oxide, compared with the Cell W1 in which erbium oxyhydroxide was not fixed on and tungsten trioxide was not made to adhere to the surface of the lithium nickel cobalt aluminum oxide, the Cell W2 in which only erbium oxyhydroxide was fixed on the surface of the lithium nickel cobalt aluminum oxide, and the Cell W3 in which only tungsten trioxide was made to adhere to the surface of the lithium nickel cobalt aluminum oxide. This is probably because, in the Cell E, a film of good quality was formed on the surface of the lithium nickel cobalt aluminum oxide.

Note that, compared with the Cell W1, the output characteristic at the low temperature is degraded in the Cells W2 and W3. The reason for this is probably as follows. In the case of the Cell W2 in which only erbium oxyhydroxide was fixed on the surface of the lithium nickel cobalt aluminum oxide, a film having a low lithium-ion permeability was formed on the surface of the lithium nickel cobalt aluminum oxide. In the case of the Cell W3 in which only tungsten trioxide was made to adhere to the surface of the lithium nickel cobalt aluminum oxide, a film having a low conductivity was formed on the surface of the lithium nickel cobalt aluminum oxide.

Sixth Example

Experiments

The Cells A, C, D, and E were measured in terms of I-V resistance value and the results are described in Table 6.

Note that the experiment conditions were the same as the conditions described in the Experiments of the First example.

TABLE 6

| Cell | Positive electrode active material | Presence or absence of fixed erbium oxyhydroxide (Fixing amount) | Presence or absence of adhering tungsten trioxide (Adhesion amount) | I-V resistance value ($\Omega$) |
|---|---|---|---|---|
| A | $LiNi_{0.55}Co_{0.20}Mn_{0.25}O_2$ | Present (0.1 mol %) | Present (0.5 mol %) | 1.79 |
| C | $LiCoO_2$ | | | 1.83 |
| D | $LiNi_{0.35}Co_{0.35}Mn_{0.3}O_2$ | | | 1.47 |
| E | $LiNi_{0.80}Co_{0.15}Al_{0.05}O_2$ | | | 3.62 |

Note that the fixing amount of erbium oxyhydroxide denotes the ratio of erbium element to the total molar quantity of lithium transition metal oxide.

The adhesion amount of tungsten trioxide denotes the ratio of tungsten trioxide to the total molar quantity of the positive electrode active material.

As is obvious from Table 6, I-V resistance values were low in the Cells A and D in which erbium oxyhydroxide was fixed on and tungsten trioxide was made to adhere to the lithium nickel cobalt manganese oxide that served as the lithium transition metal oxide and satisfied a general formula of $Li_aNi_xCo_yMn_zO_2$ ($0.9<a<1.2$, $0.3 \leq x \leq 0.6$, $0.2 \leq y \leq 0.3$, $0.2 \leq z \leq 0.4$), compared with the Cell C in which lithium cobalt oxide was used as the lithium transition metal oxide and the Cell E in which lithium nickel cobalt aluminum oxide was used as the lithium transition metal oxide.

This is probably because a film formed on the surface of lithium nickel cobalt manganese oxide specifically has a high lithium-ion permeability and a high conductivity.

INDUSTRIAL APPLICABILITY

The present invention is expected to be applied to, for example, driving power sources for mobile information terminals such as cellular phones, notebook computers, and smart phones, and high-power driving power sources for HEVs and power tools.

REFERENCE SIGNS LIST

1: rare-earth compound
2: tungsten-containing oxide
3: primary particle of lithium transition metal oxide
10: three-electrode test cell
11: working electrode (positive electrode)
12: counter electrode (negative electrode)
13: reference electrode
14: non-aqueous electrolytic solution

The invention claimed is:

1. A positive electrode for a non-aqueous electrolyte secondary battery, comprising:
   a positive electrode collector; and
   a positive electrode mixture layer formed on at least one surface of the positive electrode collector,
   wherein the positive electrode mixture layer contains positive electrode active material particles having a layered-structure lithium transition metal oxide with rare-earth compound particles fixed on surfaces of the positive electrode active material particles, further containing tungsten-containing oxide particles and a binder,
   wherein the lithium transition metal oxide forms secondary particles provided by aggregation of primary particles, and the tungsten-containing oxide is present within gaps between the primary particles,
   wherein the rare-earth compound particles have an average particle size of 1 nm to 100 nm,
   wherein a ratio of the rare-earth compound particles to a total molar quantity of the layered structure lithium transition metal oxide is 0.003 mol % to 0.25 mol %,
   wherein a ratio of a molar quantity of the tungsten-containing oxide particles to a molar quantity of the positive electrode active material particles is 0.01 mol %-3 mol %,
   wherein the tungsten-containing oxide particles are at least one of the group consisting of $WO_3$, $WO_2$ and $Li2WO_4$,
   wherein the rare-earth compound particles are at least one of the group consisting of a rare-earth hydroxide, a rare-earth oxyhydroxide and a rare-earth oxide,
   wherein the lithium transition metal oxide is $LiMeO_2$ where Me represents at least one of the group consisting of Ni, Co and Mn.

2. The positive electrode for a non-aqueous electrolyte secondary battery according to claim 1, wherein the rare-earth compound particles are a rare-earth hydroxide or a rare-earth oxyhydroxide.

3. The positive electrode for a non-aqueous electrolyte secondary battery according to claim 1, wherein a rare-earth element in the rare-earth compound particles is neodymium, samarium, or erbium.

4. The positive electrode for a non-aqueous electrolyte secondary battery according to claim 1, wherein the tungsten-containing oxide particles are tungsten trioxide.

5. The positive electrode for a non-aqueous electrolyte secondary battery according to claim 1, wherein the lithium transition metal oxide is lithium cobalt oxide.

6. The positive electrode for a non-aqueous electrolyte secondary battery according to claim 1, wherein the lithium transition metal oxide is lithium nickel cobalt manganese oxide represented by a general formula of $Li_aNi_xCo_yMn_zO_2$ ($0.95<a<1.20$, $0.3 \leq x \leq 0.8$, $0.1 \leq y \leq 0.4$, $0.1 \leq z \leq 0.5$).

7. A non-aqueous electrolyte secondary battery comprising:

the positive electrode for a non-aqueous electrolyte secondary battery according to claim 1;
a negative electrode containing a negative electrode active material;
a separator disposed between the positive electrode and the negative electrode; and
a non-aqueous electrolyte.

\* \* \* \* \*